3,313,640
FLOWABLE STARCHES
Kurt Bauer, Neuallschwil, Switzerland, assignor to Ciba Corporation, New York, N.Y., a corporation of Delaware
No Drawing. Filed Aug. 8, 1963, Ser. No. 300,932
Claims priority, application Switzerland, Aug. 23, 1962, 10,098/62
9 Claims. (Cl. 106—210)

This invention relates to dry starch which is capable of flowing well, i.e. starch the nature of the surface of which has been so altered that a substantial improvement of the flow properties is thereby obtained.

For making tablets, dragees, capsules, powders and similar preparations, various types of starch, such as maize starch, arrowroot, potato starch or wheat starch, are generally employed as filler and disintegrating agent. These types of starch, however, have poor flow properties, so that to manufacture the above-mentioned preparations special flowregulating agents, such as talc, silicic acid, stearic acid or magnesium trisilicate, must also be added.

It has now been found that the flow porperties of starch can be improved in the simplest manner by enveloping the starch particles in a film of a fatty or waxy, free, esterified or etherified aliphatic polyalcohol.

As fatty or waxy polyalcohols there may be mentioned in particular polyalkylene glycols, such as polypropylene glycol or especially polyethylene glycol, having an average gram-molecular weight of at least about 800, preferably of about 1000 to 25000 or 50000 and especially of 4000, 4000, 6000 and 20000. Mention must also be made of esterified or etherified polyalkylene glycols, such as polyalkylene glycols which are esterified with long-chain aliphatic acids, for example stearic acid, myristic acid, or palmitic acid, or etherified with aliphatic, more especially long-chain, alcohols, such as stearic, myristic or palmitic alcohols, for example nonaethylene glycol monostearate, diethylene glycol monopalmitate, diethylene glycol monostearate, polyethylene glycol 400 monostearate, polyethylene glycol 4000 monostearate, polyethylene glycol 4000 monooleate, polyethylene glycol 6000 lauroyl ether, polyethylene glycol 4000 stearoyl ether, and also polyhydroxyalkanes esterified or etherified in similar manner, such as glycerine monostearate, glycerine monooleate, glycerine monoricinoleate or sorbitan distearate.

The weight ratio of film to starch particle may vary within wide limits. It is advantageous to use amounts constituting approximately 0.1 to 40%, preferably 1 to 15% and especially 3 to 5%, of the weight of the starch. Thus, starch which is used for manufacturing powders is advantageously enveloped in films amounting to approximately 1 percent by weight. Such powders also feel softer. Starch which is used for making tablet granules and powders is advantageously coated with thicker films, especially films constituting 3–5 percent by weight, it being possible, according to whether polyalcohols which are water-soluble to a greater or lesser degree are employed, to delay as desired the disintegrating effect required for the tablets to crumble. The separate starch particles may also be only partially enveloped by the film.

The starch according to the invention which is capable of flowing well is suitably obtained by treating finely pulverised dry starch with a solution of the fatty or waxy, free, esterified or etherified aliphatic polyalcohol in a solvent free from water and removing the solvent.

Any desired solvent free from water can be employed for this purpose. In particular, those solvents will be chosen which can be removed easily afterwards, such as lowboiling alcohols, for example methanol, ethanol, propanol, butanol, methyl, ethyl, butyl glycols, ketones, for example acetone, methyl ethyl ketone or cyclohexanone, esters, for example methyl, ethyl or butyl acetate, or halogenated lower aliphatic hydrocarbons, for instance chloroform, carbon tetrachloride, ethylene chloride or especially methylene chloride. The drying of the products obtained is effected in conventional manner, for example by distilling off the solvent, in a drying cabinet or under vacuum.

A preferred embodiment of the method consists in that the starch is wetted in a mixer with a solution of 20 to 40% strength of a waxy polyethylene glycol having an average gram-molecular weight of 1000 to 25000 in dry methylene chloride or chloroform, in such manner that the amount of polyethylene glycol constitutes about 1–10 percent by weight of the starch used, the mixture is homogenised, for example by kneading, and then dried in a vacuum chamber and the dry material is thereafter sieved.

The invention is illustrated in the following examples.

*Example 1*

1 kg. of dry starch is mixed intensively with a solution of 50.0 grams of polyethylene glycol 6000 in 100.0 grams of methylene chloride in a suitable mixer. By drying for 3–4 hours at 40° C., the solvent is removed and the remaining starch coated with polyethylene glycol is thereafter sieved.

*Example 2*

1 kg. of dry starch is mixed intensively with a solution of 10.0 grams of sorbitan distearate in 100.0 grams of acetone. By drying for 5 hours at 40° C., the solvent is removed and the remaining starch coated with sorbitan distearate is thereafter sieved.

*Example 3*

1 kg. of dry starch is mixed intensively with a solution of 30.0 grams of glyceryl monoricinoleate in 100.0 grams of ethyl acetate. By drying overnight, the solvent is removed and the starch coated with glyceryl monoricinoleate is thereafter sieved.

*Example 4*

1 kg. of dry starch is mixed intensively with a solution of 100.0 grams of polyethylene glycol 4000 monooleate in 300.0 grams of ethyl alcohol. After drying for 12 hours, the starch coated with polyethylene glycol 4000 monooleate, and freed from the solvent, is sieved.

*Example 5*

1 kg. of dry starch is mixed intensively with a solution of 20.0 grams of polyethylene glycol lauroyl ether in 200.0 grams of toluene. After drying for 12 hours, the starch coated with polyethylene glycol 6000 lauroyl ether, and freed from the solvent, is sieved.

The starches capable of flowing which are obtained as described in Examples 1, 3 and 4 are used principally for manufacturing tablets and those obtained as described in Examples 2 and 5 for manufacturing pulverulent materials or powders.

What is claimed is:
1. Dry, readily flowable starch, characterized by the starch particles being enveloped in a film consisting of about 1 to about 15% of a poly-lower alkyleneglycol having an average molecular weight of about 800 to about 50,000.

2. Dry, readily flowable starch as claimed in claim 1, wherein the poly-lower alkyleneglycol is a polyethyleneglycol.

3. Dry, readily flowable starch as claimed in claim 2, wherein the poly-lower alkyleneglycol is a polyethyleneglycol having an average molecular weight of at least about 800.

4. Dry, readily flowable starch as claimed in claim 3, wherein the poly-lower alkyleneglycol is a polyethyleneglycol having an average molecular weight of 1,000 to 50,000.

5. Dry, readily flowable starch as claimed in claim 3, wherein the poly-lower alkyleneglycol is a polyethyleneglycol having an average molecular weight of 4,000.

6. Dry, readily flowable starch as claimed in claim 3, wherein the poly-lower alkyleneglycol is a polyethyleneglycol having an average molecular weight of 6,000.

7. Dry, readily flowable starch as claimed in claim 3, wherein the poly-lower alkyeneglycol is a polyethyleneglycol having an average molecular weight of 20,000.

8. Dry, readily flowable starch, characterized by the starch particles being enveloped in a film constituting about 0.1 to 40% of the weight of the starch and consisting of a poly-lower alkyleneglycol having an average molecular weight of about 800 to about 50,000.

9. Dry, readily flowable starch as claimed in claim 8, wherein the film constitutes about 3 to 5% of the weight of the starch.

References Cited by the Examiner

UNITED STATES PATENTS

| | | | |
|---|---|---|---|
| 2,819,970 | 1/1958 | Steigmann. | |
| 2,961,339 | 11/1960 | Wolff. | |
| 3,052,560 | 9/1962 | Delaney | 99—166 |
| 3,144,385 | 8/1964 | McGrew | 99—166 |

FOREIGN PATENTS 675,230  12/1963  Canada.

ALEXANDER H. BRODMERKEL, *Primary Examiner.*

D. J. ARNOLD, *Examiner.*

L. B. HAYES, *Assistant Examiner.*